(12) United States Patent
Shimizu et al.

(10) Patent No.: US 7,705,960 B2
(45) Date of Patent: Apr. 27, 2010

(54) DUST-PROOF GLASS, AND ELECTRO-OPTIC DEVICE AND PROJECTION TYPE IMAGE DISPLAY DEVICE USING THE SAME

(75) Inventors: Akihiro Shimizu, Minowa-machi (JP); Masayuki Oto, Zama (JP); Shuho Kobayashi, Okaya (JP)

(73) Assignee: Epson Toyocom Corporation, Tokyo (JP)

( * ) Notice: Subject to any disclaimer, the term of this patent is extended or adjusted under 35 U.S.C. 154(b) by 209 days.

(21) Appl. No.: 11/987,793

(22) Filed: Dec. 4, 2007

(65) Prior Publication Data

US 2008/0137023 A1 Jun. 12, 2008

(30) Foreign Application Priority Data

Dec. 11, 2006 (JP) .............................. 2006-332892
Oct. 9, 2007 (JP) .............................. 2007-262992

(51) Int. Cl.
*G02F 1/1333* (2006.01)

(52) U.S. Cl. .......................................... 349/158; 349/5
(58) Field of Classification Search .................. 349/158
See application file for complete search history.

(56) References Cited

U.S. PATENT DOCUMENTS 6,654,083 B1 * 11/2003 Toda et al. .................. 349/110

FOREIGN PATENT DOCUMENTS

| JP | A-08-304739 | 11/1996 |
| JP | B2-3639411 | 1/2005 |
| JP | B2-3799829 | 5/2006 |

* cited by examiner

*Primary Examiner*—Richard H Kim
(74) *Attorney, Agent, or Firm*—Oliff & Berridge, PLC

(57) ABSTRACT

A dust-proof glass is provided on a light incident surface of a transmission-type liquid crystal panel. The dust-proof glass includes: a reflection section which is provided at an outer edge of a light incident surface of the dust-proof glass; and a notch section which is formed at an outer edge of a light emitting surface of the dust-proof glass.

12 Claims, 12 Drawing Sheets

DUST-PROOF GLASS, AND ELECTRO-OPTIC DEVICE AND PROJECTION TYPE IMAGE DISPLAY DEVICE USING THE SAME

BACKGROUND OF THE INVENTION

1. Technical Field

The present invention relates to a dust-proof glass which is used for a projection-type display device or the like, and relates to an electro-optic device and a projection-type image display device using the same.

2. Related Art

An electro-optic device which includes a transmission-type liquid crystal panel is used for a projection-type display device or the like. In the projection-type display device, light which is transmitted through a transmission-type liquid crystal panel is projected onto a screen or the like by a projection lens. At this time, since a scratch on a light incident surface of the transmission-type liquid crystal panel, a dust stuck to the light incident surface, or the like is within a short distance of a liquid crystal in a focus state, they are projected onto the screen, causing deteriorating display quality. To reduce the effects of such scratch, dust or the like, a dust-proof glass is attached on the light incident surface of the transmission-type liquid crystal panel and the distance between the liquid crystal in a focus state and the dust is increased so that the focus position is displaced. As a result, the scratch, dust or the like is made difficult to see even when it is projected onto the screen or the like. In addition, a light shielding film is provided on the dust-proof glass to prevent light from being incident to the outside of a display range of the transmission-type liquid crystal panel. Accordingly, a structure that includes a configuration and a two-layer light-shielding film is known. (See Japanese Patent No. 3799829 (page 22, FIG. 14).) In this configuration, a light shielding film for the dust-proof glass is provided on a side of a liquid crystal light bulb side that serves as the transmission-type liquid crystal panel (hereinafter referred to as "the light emitting surface of the dust-proof glass"). The two-layer light-shielding film includes a reflective film which reflects incident light from the outside and an absorbing layer which absorbs light from the side of the liquid crystal light valve.

In the case where a reflective film is provided on the light emitting surface of the dust-proof glass, incident light is transmitted through a surface of the dust-proof glass and reaches the reflective film. A part of the incident light reflected by the reflective film travels to the surface of the dust-proof glass again. Reflection occurs again on the surface of the dust-proof glass, and then a part of the incident light travels to the transmission-type liquid crystal panel. The light, however, has an incident angle that is different from an incident angle of a normal light beam. Therefore, the light is reflected by the transmission-type liquid crystal panel so that it will become feedback light or stray light. As a result, deterioration of display quality such as deterioration of display contrast, display unevenness or the like is likely to occur.

SUMMARY

An advantage of the invention is to provide a dust-proof glass which enables improving display quality and an electro-optic device and a projection-type image display device using the same.

A dust-proof glass according to a first aspect of the invention is a dust-proof glass which is provided on a light incident surface of a transmission-type liquid crystal panel. The dust-proof glass includes: a reflection section which is provided at an outer edge of a light incident surface of the dust-proof glass; and a notch section which is formed at an outer edge of a light emitting surface of the dust-proof glass.

According to the first aspect, the reflection section is provided on the light incident surface of the dust-proof glass. Therefore, incident light which travels to the outer edge of the light incident surface is reflected toward the outside by the reflection section. Accordingly, the amount of light which travels to the transmission-type liquid crystal panel again decreases. Therefore, generation of stray light is reduced. As a result, display quality is improved.

In addition, according to the first aspect, the notch section is more recessed than the light emitting surface of the dust-proof glass. Therefore, feedback light which travels from the inside of the transmission-type liquid crystal panel to the notch section is reflected by the notch surface of the notch section and subsequently travels to the end face, and thus the feedback light will not become unnecessary stray light. Accordingly, generation of stray light is reduced. As a result, display quality is improved.

It is preferable that a length of a normal line which is substantially perpendicular to the light incident surface of the dust-proof glass and intersects with a notch surface of the notch section decrease as the normal line gets closer to an end face of the dust-proof glass.

In the glass, the notch surface is inclined so as to reflect the feedback light toward the outside. Therefore, much of the feed back light which travels from the inside of the transmission-type liquid crystal panel to the notch section is reflected toward the outside. Accordingly, generation of stray light is reduced. As a result, display quality is improved.

It is preferable that a surface roughness Ra of the notch surface be 0.5 μm to 20 μm.

In the glass, asperity of the surface of the notch surface of the notch section of which the surface roughness Ra is expressed as 0.5 μm to 20 μm causes light in the visible range to scatter. Therefore, the amount of light which travels in a particular direction decreases. Accordingly, display unevenness or the like is reduced. As a result, display quality is improved.

It is preferable that the reflection section be a metal film.

In the glass, the metal film has high reflectivity in the visible range. Therefore, the amount of light which is transmitted through the metal film, that is, the amount of light incident to the outside of the display range of the liquid crystal panel decreases. Therefore, generation of stray light is reduced. As a result, display quality is improved.

It is preferable that the notch section include a light absorbing layer.

In the glass, not only the notch section controls reflection, but also the light absorbing layer absorbs light. Therefore, reflectivity at the notch section decreases. Accordingly, the light which is reflected by the notch section and which subsequently travels to the transmission-type liquid crystal panel decreases. Therefore, generation of stray light is reduced. As a result, display quality is improved.

A transmission-type liquid crystal panel according to a second aspect of the invention includes: a dust-proof glass which is provided on a light incident surface of the transmission-type liquid crystal panel; a reflection section which covers an outer edge of the light incident surface of the dust-proof glass; a case which covers a periphery of a liquid crystal device including the transmission-type liquid crystal panel and the dust-proof glass; and a filler which is provided in a gap between the periphery of the liquid crystal device and the case and which absorbs or scatters light. The dust-proof glass includes a notch section which is formed at an outer edge of a light emitting surface of the dust-proof glass.

According to the second aspect, the reflection section is provided so as to cover the outer edge of the light incident surface of the dust-proof glass. Therefore, the incident light which travels to the outer edge of the light incident surface is reflected toward the outside by the reflection section. Accordingly, generation of stray light which passes through the inside of the dust-proof glass and which travels to the transmission-type liquid crystal panel is reduced. As a result, display quality is improved.

In addition, in the panel, the notch surface is more recessed than the light emitting surface of the dust-proof glass. Therefore, the feedback light which travels from the inside of the transmission-type liquid crystal panel to the notch surface is reflected by the notch surface and subsequently travels to the filler, unlike the case where the feedback light is reflected by a reflective film on a light emitting surface of a dust-proof glass of the related art. Since light is absorbed or scattered in the filler, generation of stray light is reduced. As a result, display quality is improved.

It is preferable that the filler be filled also in a gap between the notch section and the transmission-type liquid crystal panel.

In the panel, the feedback light is absorbed by the filler which is filled in the gap between the notch surface and the transmission-type liquid crystal panel. Therefore, reflection at the notch section is further reduced. Accordingly, generation of stray light is reduced. As a result, display quality is improved.

It is preferable that the reflection section be an extension section which is provided on an end face of the case and which extends toward a side closer to a center of the dust-proof glass.

In the panel, the extension section of the case is made to serve as the reflection section. Therefore, display quality can be easily improved merely by providing the extension section on the end face of the case.

It is preferable that a length of a normal line which is substantially perpendicular to the light incident surface of the dust-proof glass and which intersects with a notch surface of the notch section decrease as the normal line gets closer to an end face of the dust-proof glass.

In the panel, the notch surface is inclined so as to reflect the incident light toward the outside. Therefore, the feedback light which travels from the inside of the transmission-type liquid crystal panel to the notch surface is reflected further toward the filler. Since light is absorbed or scattered in the filler, generation of stray light is reduced. As a result, display quality is improved.

It is preferable that a surface roughness Ra of the notch surface of the notch section be 0.5 μm to 20 μm.

In the panel, asperity of the surface of the notch surface of which the surface roughness Ra is expressed as 0.5 μm to 20 μm causes light in the visible range to scatter. Therefore, the amount of light which travels in a particular direction decreases. Accordingly, display unevenness or the like is reduced. As a result, display quality is improved.

It is preferable that the reflection section be a metal film which is provided at an outer edge of the light incident surface of the dust-proof glass.

In the panel, the metal film has high reflectivity in the visible range. Therefore, the amount of light which is transmitted through the metal film, that is, the amount of light incident to the outside of the display range of the liquid crystal panel decreases. Therefore, generation of stray light is reduced. As a result, display quality is improved.

It is preferable that the notch section include a light absorbing layer.

In the panel, not only the notch section controls reflection, but also the light absorbing layer absorbs light. Therefore, reflectivity at the notch section decreases. Accordingly, the light which is reflected by the notch section and subsequently travels again to the transmission-type liquid crystal panel decreases. Therefore, generation of stray light is reduced. As a result, display quality is improved.

A projection-type image display device according to a third aspect of the invention includes: an electro-optic device which modulates a light flux emitted from a light source in accordance with image information; and a projection lens which magnifies the light flux modulated by the electro-optic device and projects it. The electro-optic device includes the dust-proof glass according to the first aspect of the invention.

According to the third aspect, the electro-optic device of the projection-type image display device includes the dust-proof glass as described above. Therefore, the device according to the third aspect generates less stray light and is superior in display quality.

Specifically, the reflection section is provided on the light incident surface of the dust-proof glass. Therefore, the incident light which travels to the outer edge of the light incident surface is reflected toward the outside by the reflection section. Accordingly, the amount of light which travels to the transmission-type liquid crystal panel again decreases. Therefore, generation of stray light is reduced. As a result, display quality is improved.

In addition, in the third aspect, the notch section is more recessed than the light emitting surface of the dust-proof glass. Therefore, feedback light which travels from the inside of the transmission-type liquid crystal panel to the notch section is reflected by the notch surface of the notch section and subsequently travels to the end face, and thus the feedback light will not become unnecessary stray light. Accordingly, generation of stray light is reduced. As a result, display quality is improved.

A projection-type image display device according to a fourth aspect of the invention includes: an electro-optic device which modulates a light flux emitted from a light source in accordance with image information; and a projection lens which magnifies the light flux modulated by the electro-optic device and projects it. The projection-type image display device includes the electro-optic device according to the second aspect of the invention.

According to the fourth aspect, the projection-type image display device includes the electro-optic device described as above. Therefore, the device according to the fourth aspect generates less stray light and is superior in display quality.

Specifically, the reflection section is provided on the light incident surface of the dust-proof glass. Therefore, the incident light which travels to the outer edge of the light incident surface is reflected toward the outside by the reflection section. Accordingly, light which travels to the transmission-type liquid crystal panel again decreases. Therefore, generation of stray light is reduced. As a result, display quality is improved.

In addition, the fourth aspect includes the case which covers the periphery of the liquid crystal device which includes the transmission-type liquid crystal panel and the dust-proof glass, and the filler which is in the gap between the periphery of the liquid crystal device and the case and which absorbs or scatters light. Therefore, the feedback light which travels from the inside of the transmission-type liquid crystal panel to the notch section is reflected by the notch surface of the notch section, and is subsequently absorbed or scattered by the filler as described above. Accordingly, generation of stray light is reduced. As a result, display quality is improved.

It is preferable that the electro-optic device include: a transmission-type liquid crystal panel, a case which covers a periphery of a liquid crystal device including the transmission-type liquid crystal panel and the dust-proof glass, and a filler which is provided in a gap between the periphery of the liquid crystal device and the case and which absorbs or scatters light.

In the device, the feedback light which travels from the inside of the transmission-type liquid crystal panel to the notch surface is reflected by the notch surface and subsequently travels to the filler. Since light is absorbed or scattered in the filler, generation of stray light is reduced. As a result, display quality is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the accompanying drawings.

First Embodiment

Figure 1:
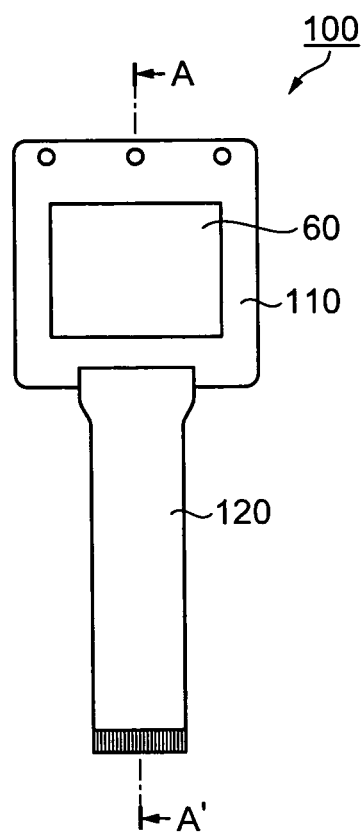
FIG. 1 is a plan view showing an electro-optic device according to First Embodiment of the invention.
Figure 2:
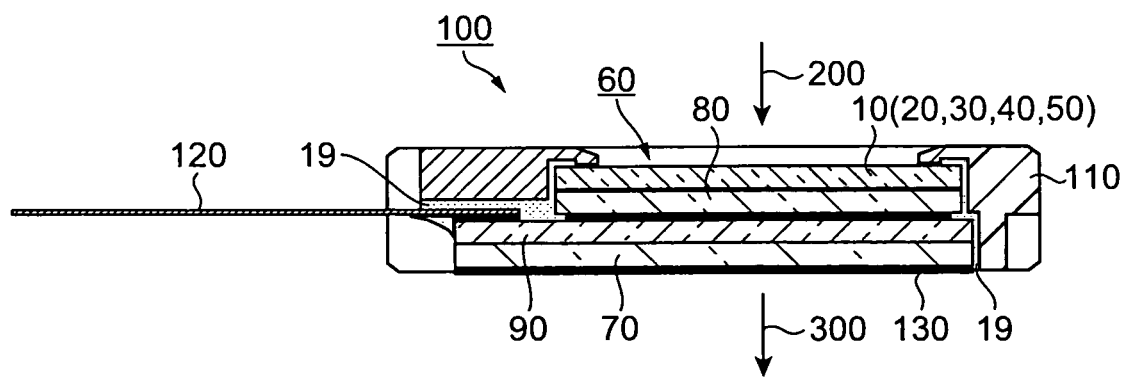
FIG. 2 is an A-A' cross-sectional view of the electro-optic device in FIG. 1.
Figure 3:
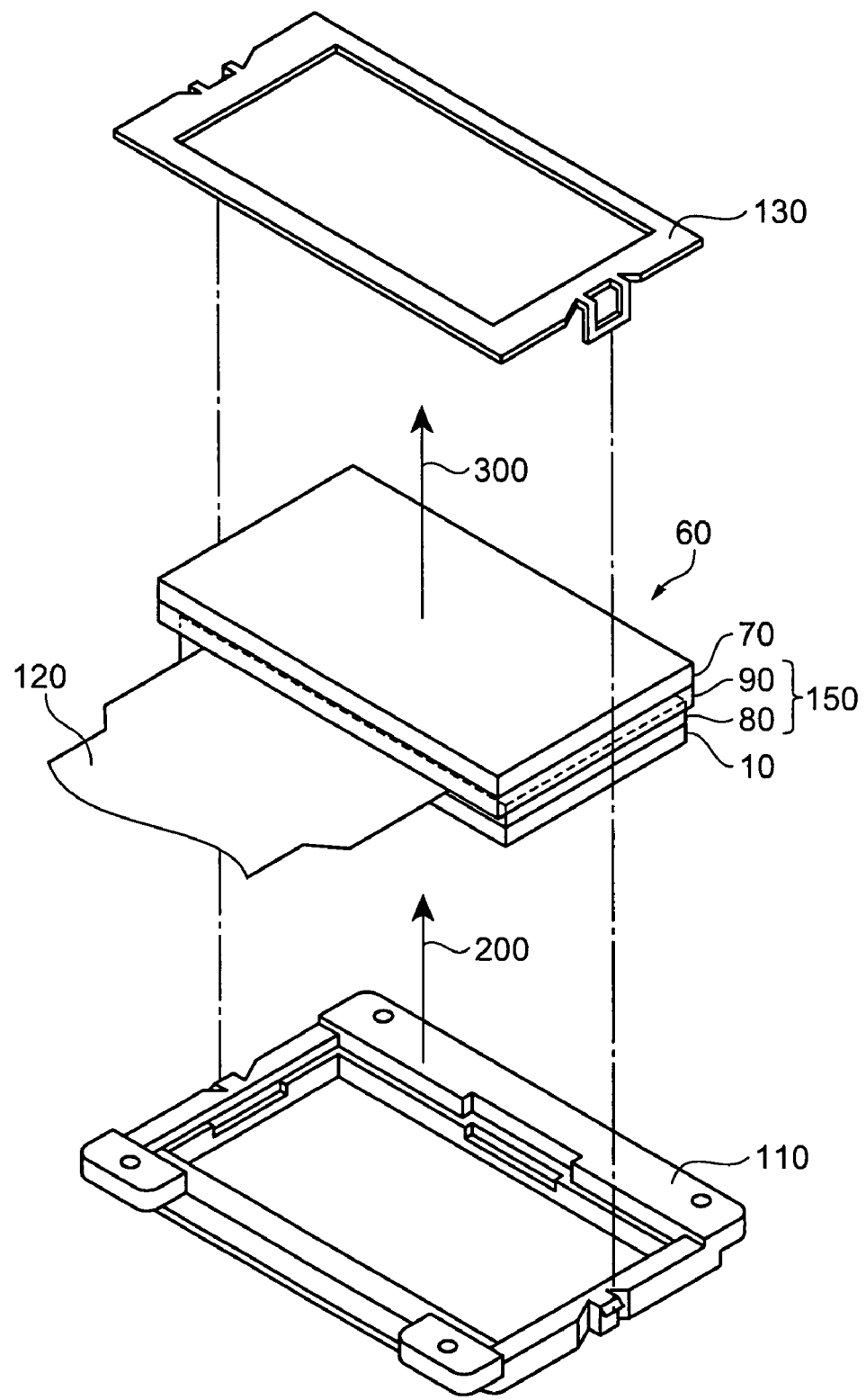
FIG. 3 is an exploded perspective view showing the electro-optic device.

FIG. 1 is a plan view showing an electro-optic device 100 according to the first embodiment. FIG. 2 is an A-A' cross-sectional view of the electro-optic device 100 in FIG. 1. FIG. 3 is an exploded perspective view of the electro-optic device 100.

In FIG. 1 and FIG. 2, the electro-optic device 100 includes a liquid crystal device 60, a case 110, a hook 130 and a flexible printed circuit 120.

In FIG. 2, a peripheral section of the liquid crystal device 60 is sandwiched by the case 110 and the hook 130. A filler 19 is filled in between the liquid crystal device 60 and the case 110. In addition, the flexible printed circuit 120 is connected to the liquid crystal device 60, and is drawn from the case 110.

In FIG. 2, incident light 200 is incident from the top with respect to the drawing sheet and is emitted as emitted light 300 to the bottom with respect to the drawing sheet. Contrary to this, in FIG. 3, the incident light 200 in incident from the bottom to the top with respect to the drawing sheet. Although an incident angle is expressed as if it appears to be 0° in the drawings, light is actually incident with a slight inclination. For example, the incident angle is between 0° to 15°.

In FIG. 2 and FIG. 3, the liquid crystal device 60 includes a transmission-type liquid crystal panel 150, a light-incident side dust-proof glass 10 and a light emitting surface dust-proof glass 70. The light-incident side dust-proof glass 10 is provided on the light incident side of the transmission-type liquid crystal panel 150 and serves as the dust-proof glass. The light emitting surface dust-proof glass 70 is provided on the light emitting surface.

The transmission-type liquid crystal panel 150 includes a transparent liquid crystal electrode substrate (hereinafter referred to as a transparent substrate) 90 and a counter substrate 80. The counter substrate 80 is smaller than the transparent substrate 90, and peripheral portions of the transparent substrate 90 are laminated to each other in the state where the peripheral portions protrude from a peripheral edge of the counter substrate 80.

The liquid crystal device 60 will now be described in more details with reference to the accompanying drawings.

Figure 4:
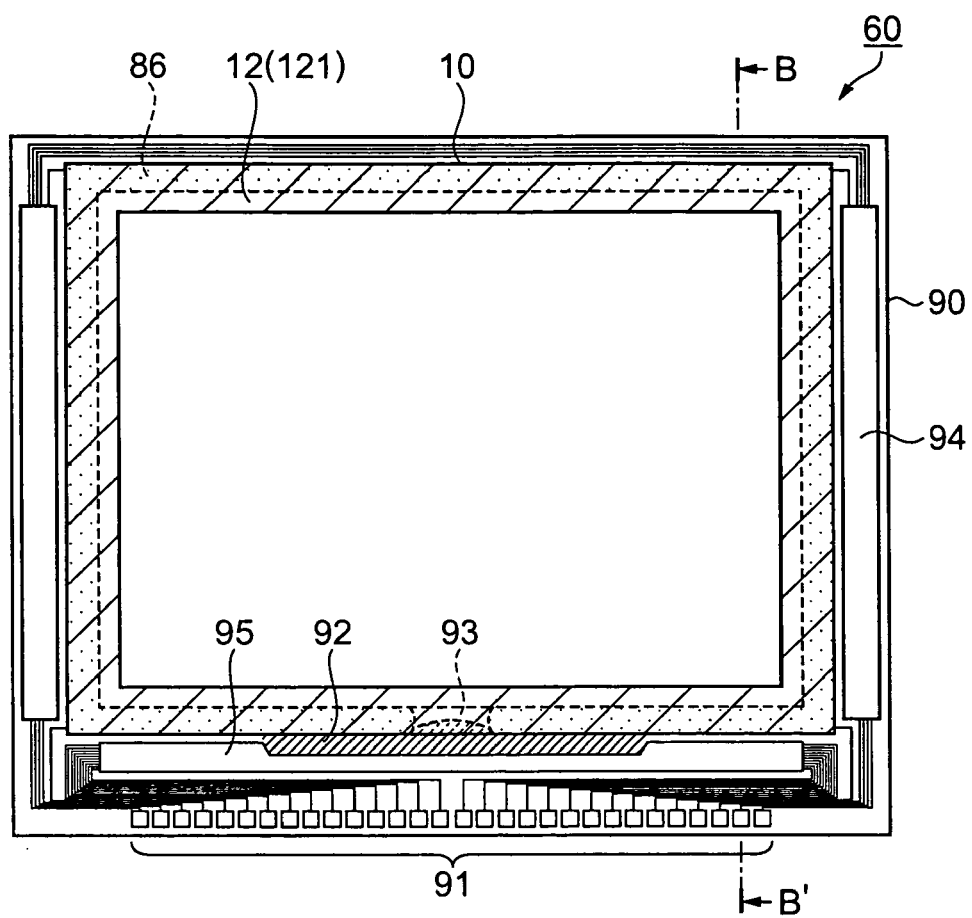
FIG. 4 is a plan view showing a liquid crystal device.
Figure 5:
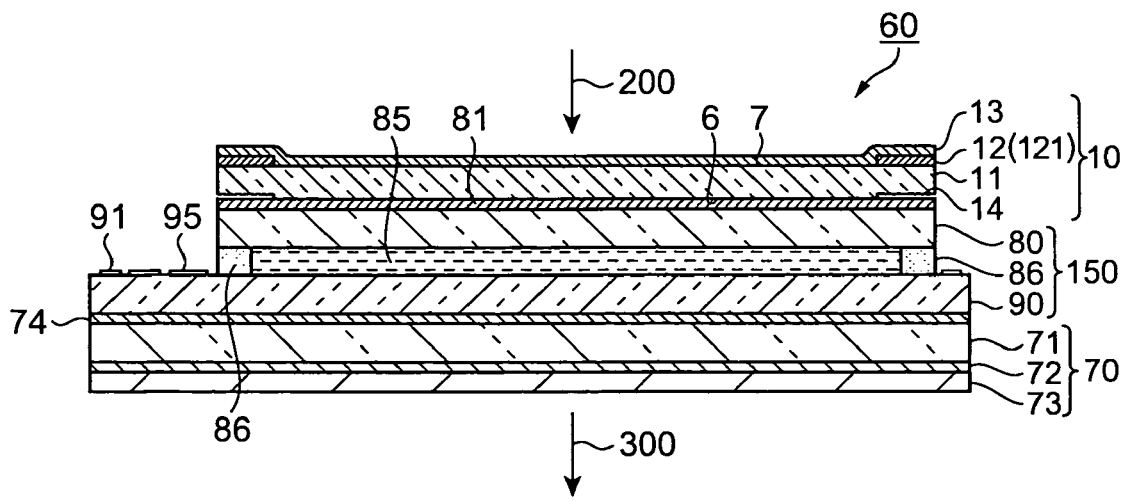
FIG. 5 is a B-B' cross-sectional view showing the liquid crystal device in FIG. 4.

FIG. 4 is a plan view showing the liquid crystal device 60. FIG. 5 is a B-B' cross-sectional view of the liquid crystal device 60 in FIG. 4.

In FIG. 4 and FIG. 5, a space enclosed by the transparent substrate 90 and the counter substrate 80 of the transmission-type liquid crystal panel 150 and the seal layer 86 is filled with a liquid crystal 85. The liquid crystal 85 is poured through a liquid crystal pouring port 93, and the liquid crystal pouring port 93 is clogged with a sealer 92, whereby the liquid crystal 85 is sealed. An input terminal 91, a scan line drive circuit 95 and a data line drive circuit 94 are arranged at a portion which protrudes from the peripheral edge of the counter substrate 80 of the surface of the transparent substrate 90. The surface of the transparent substrate 90 is opposed to the counter substrate 80. The flexible printed circuit 120 as described above is connected through wiring to the input terminal 91. In FIG. 5, the incident light 200 is incident from the top with respect to the drawing sheet and is emitted as the emitted light 300 to the bottom with respect to the drawing sheet.

In FIG. 4 and FIG. 5, the light-incident side dust-proof glass 10 includes a dust-proof glass substrate 11, a reflective film 121 that serves as a reflection section 12, a notch section 14 and an anti-reflection film 13.

For example, quartz, crystal, alkali-free glass or the like may be used as the dust-proof glass substrate 11.

The reflective film 121 is provided at the periphery of a light incident surface 7 of the dust-proof glass substrate 11. As shown in FIG. 4, the shape of the reflective film 121 when viewed from the light incident side is a rectangular ring which surrounds an image display range. Much of the incident light 200 is transmitted through the image display range of the dust-proof glass substrate 11, and is incident to the inside of the transmission-type liquid crystal panel 150. A part of the incident light 200 is reflected by the reflective film 121.

The notch section 14 is provided at the outer edge of the light emitting surface 6 of the dust-proof glass substrate 11. The shape of the notch section 14 when viewed from a light emitting surface 6 is, although not shown, a rectangular ring which surrounds the image display range, which is similar to the shape of the reflective film 121.

In FIG. 5, the anti-reflection film 13 is formed on the light incident surface 7 of the dust-proof glass substrate 11.

The light-incident side dust-proof glass 10 and the counter substrate 80 are laminated to each other with an adhesion layer 81. Making the refractive index of the adhesion layer 81 closer to the refractive index of the light-incident side dust-proof glass 10 and the refractive index of the counter substrate 80 enables suppress reflection at the interfaces of the adhesion layer 81.

In FIG. 5, the light emitting surface dust-proof glass 70 includes a dust-proof glass substrate 71 and a poralizing sheet 73. The poralizing sheet 73 is laminated on the light emitting surface of the dust-proof glass substrate 71 with an adhesion layer 72. In addition, the light emitting surface dust-proof glass 70 is laminated on the transparent substrate 90 with an adhesion layer 74. As is the case with the adhesion layer 81, making the respective refractive indexes of the adhesion layers 72, 74 closer to the refractive indexes of the materials to be laminated also enables suppressing reflection at the interfaces of the adhesion layers 72, 74. Note that the poralizing sheet 73 need not be always adhered to the dust-proof glass substrate 71.

The light-incident side dust-proof glass 10 that serves as the dust-proof glass according to the embodiment will now be described in more details with reference to the accompanying drawings.

Figure 6A:
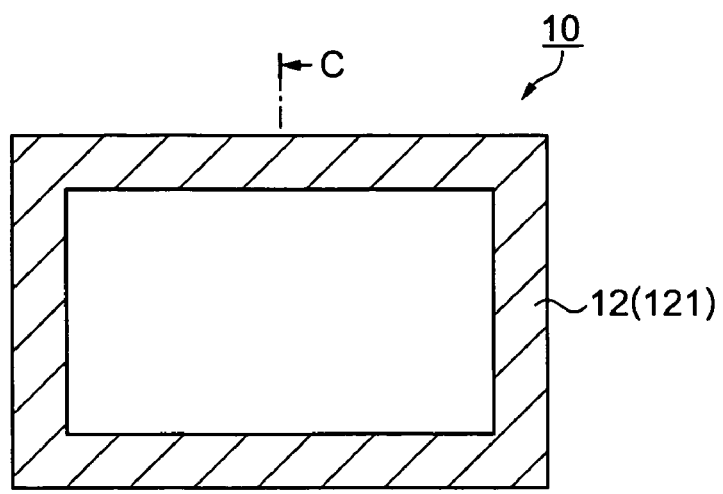
FIG. 6A is a plan view showing a light-incident side dust-proof glass according to First Embodiment of the invention.
Figure 6B:
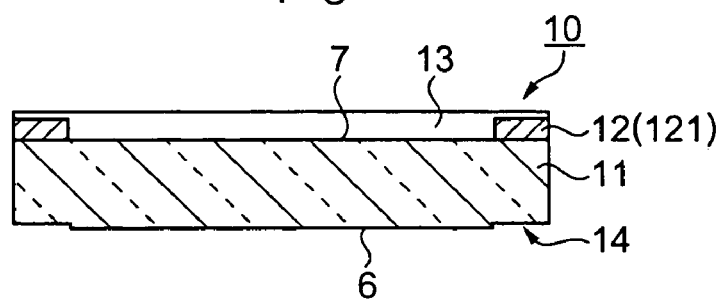
FIG. 6B is a C-C' cross-sectional view of FIG. 6A.
Figure 7:
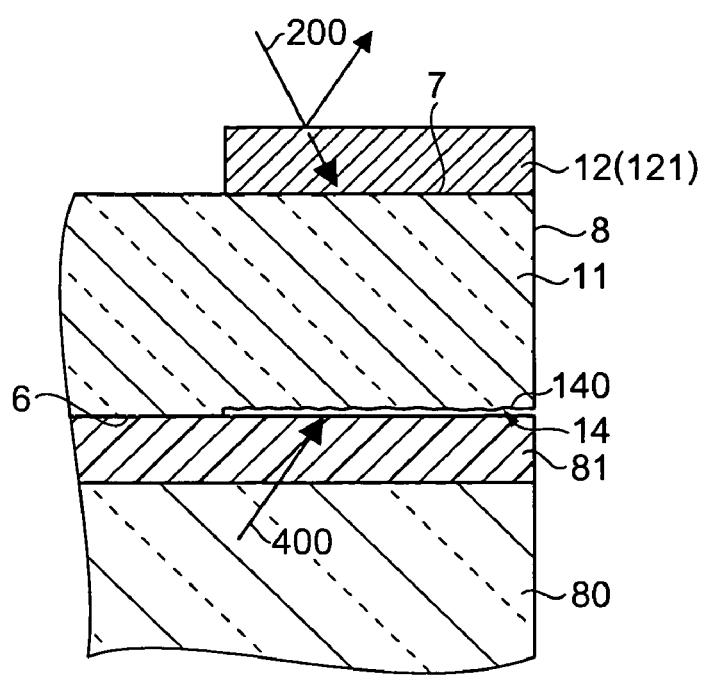
FIG. 7 is a partially expanded view showing the vicinity of a reflective film and a notch section.

FIG. 6A is a plan view showing the light-incident side dust-proof glass 10, and FIG. 6B is a C-C' cross-sectional view of FIG. 6A. FIG. 7 is a partially expanded view of the vicinity of the reflective film 121 and the notch section 14.

In FIG. 6, the reflective film 121 is formed on the peripheral section of the light incident surface 7 of the dust-proof glass substrate 11. A metal film made of such as chromium, aluminum, silver or the like may be used as the reflective film 121.

The anti-reflection film 13 is formed on the light incident surface 7 including the reflective film 121. A film of a single layer or multiple layers may be used as the anti-reflection film 13.

The notch section 14 is formed on the outer edge section of the light emitting surface 6 of the dust-proof glass substrate 11. Furthermore, the notch section 14 is formed on the light emitting surface 6 toward an end face 8 of the dust-proof glass substrate 11. The surface roughness Ra of a notch surface 140 is 0.5 to 20 μm.

In FIG. 7, the dust-proof glass substrate 11 is adhered to the counter substrate 80 with the adhesion layer 81. A part of the incident light 200 is reflected by the reflective film 121. On the other hand, a part of the incident light 200 which is incident to the inside of the transmission-type liquid crystal panel 150 shown in FIG. 5 is reflected by the interfaces of individual members and elements such as electrodes that exist in the transmission-type liquid crystal panel 150, and then becomes feedback light 400.

The method of manufacturing the light-incident side dust-proof glass 10 of the embodiment will now be described. FIG. 8A to FIG. 8D are a production process chart of the light-incident side dust-proof glass 10 of the embodiment. The light-incident side dust-proof glass 10 is obtained by cutting a large-sized glass substrate 1 and separating it. A reflective film 2, an anti-reflection film 3 and a notch section 4 are formed on the large-sized glass substrate 1.

Figure 8A:
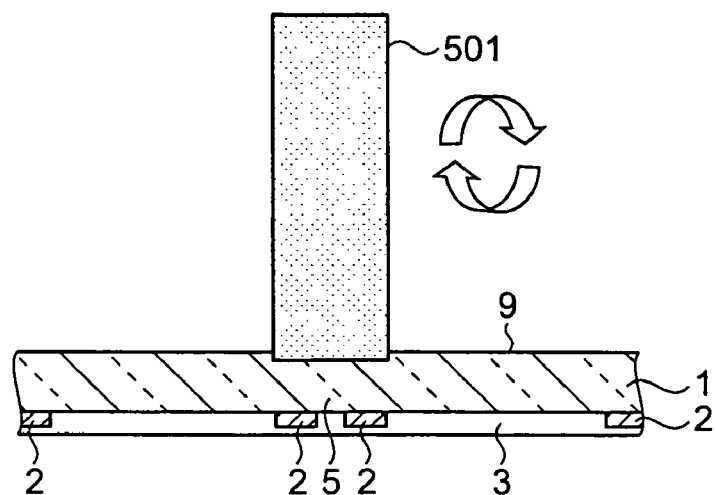
FIG. 8A to FIG. 8D are production process charts of the light-incident side dust-proof glass.

FIG. 8A shows a process of forming the notch section 4.

In FIG. 8A, the reflective film 2 and the anti-reflection film 3 are formed in advance on the light incident surface of the large-sized glass substrate 1. The reflective film 2 is formed by deposition and spattering of a metal such as chromium, aluminum, silver or the like. Rectangular ring-shaped patterns of the reflective film 121 of the light-incident side dust-proof glass 10 shown in FIG. 5 are formed such that the patterns sandwich a notch margin 5 and are aligned in the longitudinal and horizontal directions.

The anti-reflection film 3 can be formed by forming a well-known dielectric film of a single layer or multiple layers according to the deposition method, the spattering method or the like.

A dicing blade 501 is hit on a surface 9 of the large-sized glass substrate 1. The surface 9 is opposed to the surface on which the reflective film 2 and the anti-reflection film 3 are formed. As a result, the notch section 4 is formed of which surface has been made rough. The dicing blade 501 is hit at positions that are opposed to the reflective films 2 that are aligned so as to sandwich the notch margin 5.

The DFD 600 or 6000 series of a parallel-dual type manufactured by Disco Corporation may be used as the dicing saw, and resin bonds #100 to 280 of the KIA series manufactured by Disco Corporation may be used as the dicing blade 501.

Besides the dicing saw, roughening may be performed by a laser machine.

Figure 8B:
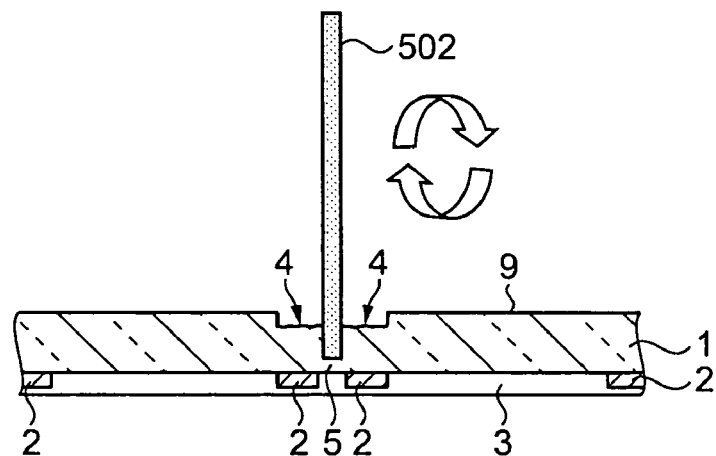
Figure 8C:
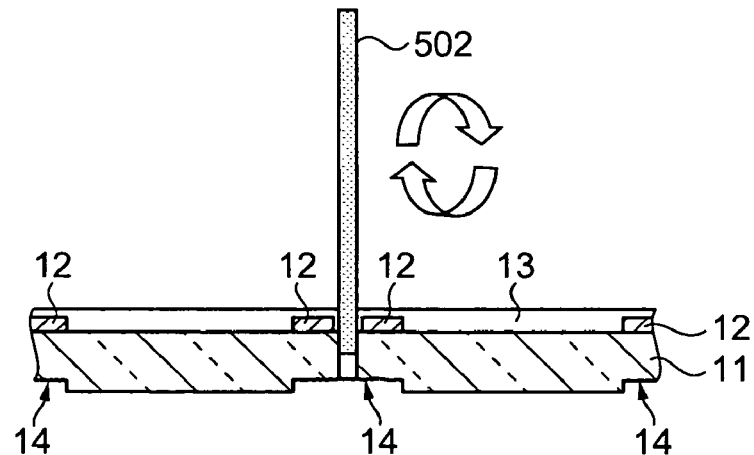

FIG. 8B and FIG. 8C show processes that separate the large-sized glass substrate 1 into the light-incident side dust-proof glasses 10.

In FIG. 8B, a dicing blade 502 is hit on the notch margin 5. As a result, a groove is created in the surface 9 on which the notch section 4 is formed up to the middle of the notch margin 5.

A similar tool as used in the roughening process is used as the dicing saw. Metal bonds #400 to 500 of the PIA series manufactured by Disco Corporation may be used as the dicing blade 502 for cutting the large-sized glass substrate 1.

Figure 8D:
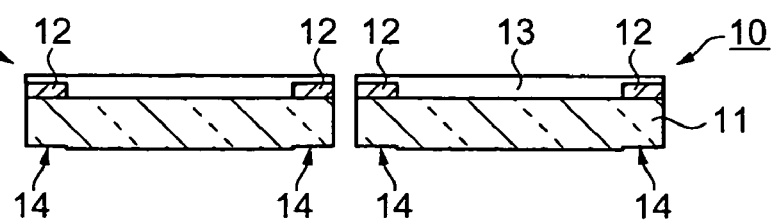

In FIG. 8C, the dicing blade 502 is hit on the face of the large-sized glass substrate ion which the reflective film 2 and the anti-reflection film 3 are formed and at positions that correspond to the groove which is formed on the notch margin 5, and whereby the large-sized glass substrate 1 is cut out. As a result, a plurality of the light-incident side dust-proof glasses 10 are obtained as shown in FIG. 8D.

Figure 9A:
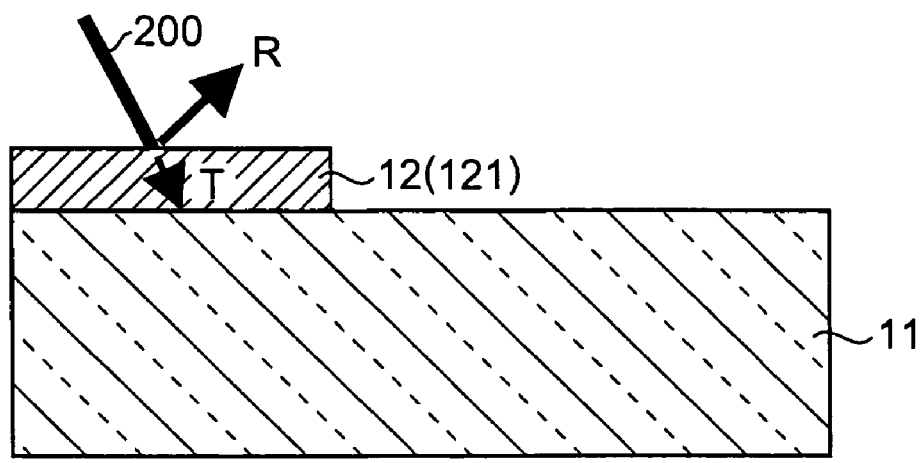
FIG. 9A is a diagram showing how incident light is reflected and transmitted in the embodiment.

FIG. 9A is a diagram showing how the incident light 200 is reflected and transmitted by the reflective film 121 in the embodiment, and FIG. 9 B is a diagram showing how the incident light 200 is reflected and transmitted in a related art. In this case, the anti-reflection film 13 is not taken into consideration.

The reflective film 121 according to the embodiment as shown in FIG. 9A is provided on the surface on the incident side of the incident light 200 of the dust-proof glass substrate 11. The incident light 200 is separated into reflective light R and transmitted light T on the reflective film 121. The amount of light of the reflective light R is approx. 60 to 70% of the entire incident light 200. Accordingly, approx. 60 to 70% of the incident light 200 is shielded by the reflective film 121 and thus does not reach the transmission-type liquid crystal panel.

Figure 9B:
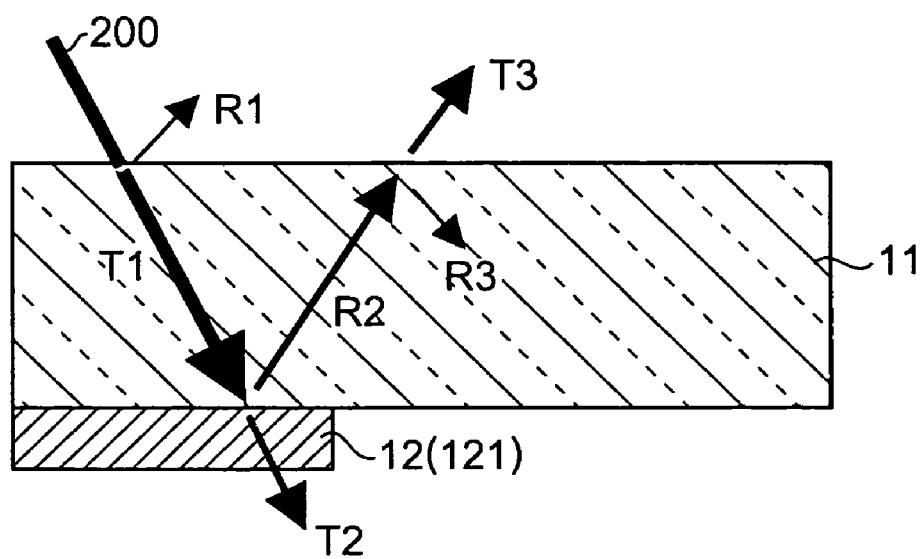
FIG. 9B is a diagram showing how incident light is reflected and transmitted in a related art.

In the related example shown in FIG. 9B, the reflective film 121 is provided on the light emitting side of the dust-proof glass substrate 11. The incident light 200 is separated into reflective light R1 and transmitted light T1 at the surface of the dust-proof glass substrate 11. The amount of light of the reflective light R1 is approx. 3 to 5% of the entire incident light 200. The transmitted light T1 is transmitted through the dust-proof glass substrate 11, and separated into reflective light R2 and transmitted light T2 by the reflective film 121. The reflective light R2 is transmitted through the inside of the dust-proof glass substrate 11, and separated into transmitted light T3 and reflective light R3 at the interface between the glass and the air. The amount of light of the reflective light R1 and the amount of light of the transmitted light T3 are measured collectively, and are approx. 50 to 55% of the entire incident light 200.

Accordingly, approx. 50 to 55% of the incident light 200 is shielded by the reflective film 121, and thus does not reach the transmission-type liquid crystal panel. As described above, the amount of light shielded by the reflective film 121 of the dust-proof glass in the present embodiment is higher than that in the related example by 10 to 20%.

Advantageous effects according to First Embodiment will now be described.

(1) The reflective film 121 is provided on the light incident surface 7 of the dust-proof glass substrate 11, which enables reflecting the incident light 200 at the light incident surface 7 toward the outside. Accordingly, the amount of light shielded outside of the image display range increases. Therefore, generation of stray light can be reduced. As a result, display quality can be improved.

(2) The notch section 14 is more recessed than the light emitting surface 6 of the dust-proof glass substrate 11. Therefore, the feedback light 400 which travels from the inside of the transmission-type liquid crystal panel 150 toward the notch section 14 is subsequently is reflected by the notch surface 140 and travels to the outside, compared to the case where light is reflected by the light emitting surface 6 of the dust-proof glass substrate 11. Accordingly, generation of stray light can be reduced. As a result, display quality can be improved.

(3) Asperity of the surface of the notch surface 140 of which the surface roughness Ra is expressed as 0.5 µm to 20 µm enables scattering light in the visible range. Therefore, the amount of light which travels in a particular direction can be decreased. Accordingly, the embodiment enables reducing display unevenness or the like and improving display quality.

(4) The reflective film 121 is a metal film and thus has high reflectivity in the visible range. Accordingly, the amount of light which is transmitted through the metal film can be made smaller. Therefore, generation of stray light can be reduced. As a result, display quality can be improved.

(5) Since the reflective film 121 is a metal film, it can be specialized for the reflection function. Accordingly, the reflective film 121 can be made in a single layer. Therefore, the reflective film 121 can be easily formed.

(6) The reflective film 121 is provided on the light incident surface 7 of the dust-proof glass substrate 11. Therefore, the distance between the reflective film 121 and the transmission-type liquid crystal panel 150 can be made larger, compared to the case where the reflective film 121 is provided on the light emitting surface 6. Accordingly, even when the temperature of the reflective film 121 increases because of light absorption, the effect of the temperature on the transmission-type liquid crystal panel 150 can be reduced, and deterioration of display quality caused by drop in the liquid crystal operation can be reduced.

(7) The notch section 14 can be formed, using the dicing blade 501, in the process of separating the large-sized glass substrate 1 into the light-incident side dust-proof glasses 10. As a result, the process can be simplified.

Second Embodiment

Figure 10A:
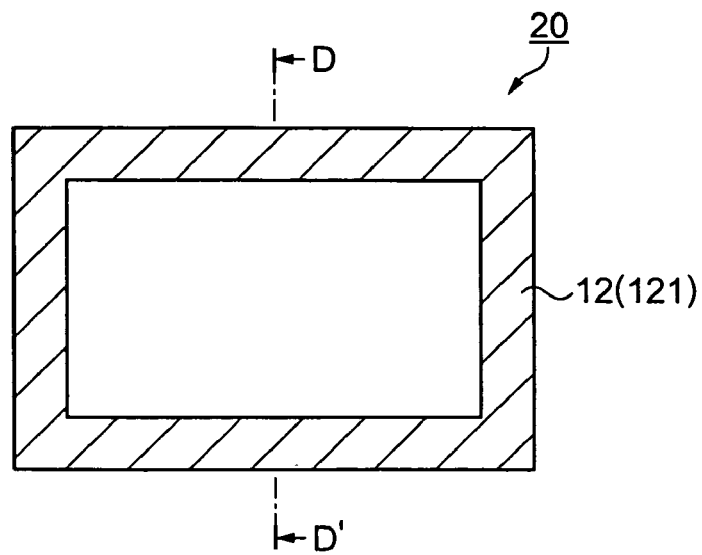
FIG. 10A is a plan view showing a light-incident side dust-proof glass according to Second Embodiment of the invention.
Figure 10B:
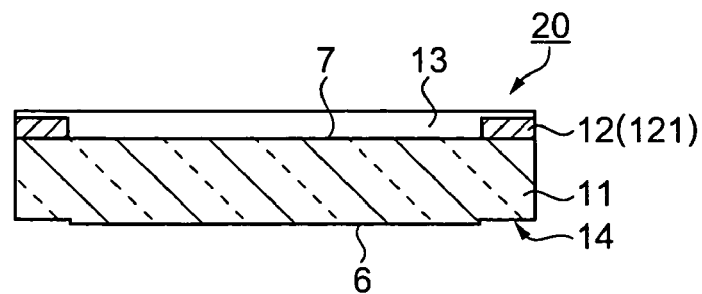
FIG. 10B is a D-D' cross-sectional view of FIG. 10A.
Figure 11:
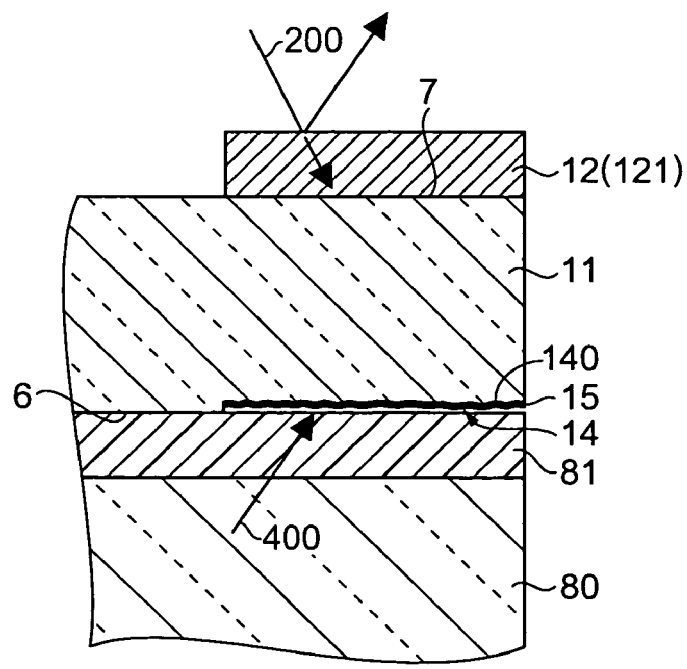
FIG. 11 is a partially expanded view showing the vicinity of a reflective film and a notch section.

FIG. 10A is a plan view showing a light-incident side dust-proof glass 20 of the second embodiment, and FIG. 10B is a D-D' cross-sectional view of FIG. 10A. FIG. 11 is a partially expanded view of the vicinity of the reflective film 121 and the notch section 14.

The embodiment differs from First Embodiment in the fact that a black layer 15 that serves as the light absorbing layer is provided on the surface of the notch surface 140.

A black-lacquered material or a material in which carbon black has been dispersed may be used for the black layer 15. For example, CK-7800L manufactured by FUJIFILM Electronic Materials Co., Ltd. may be used.

Advantageous effects according to Second Embodiment will now be described.

(8) Not only the notch section 14 controls reflection of the feedback light 400, but also the black layer 15 absorbs the feedback light 400. Therefore, reflectivity at the notch section 14 can be decreased. Accordingly, the light which is reflected by the notch section 14 and subsequently travels to the transmission-type liquid crystal panel 150 can be reduced. Therefore, generation of stray light can be reduced. As a result, display quality can be improved.

Third Embodiment

Figure 12A:
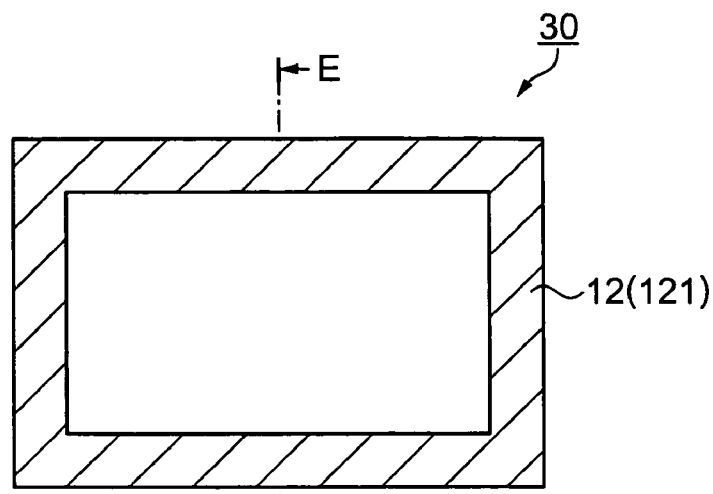
FIG. 12A is a plan view showing a light-incident side dust-proof glass according to Third Embodiment of the invention.
Figure 12B:
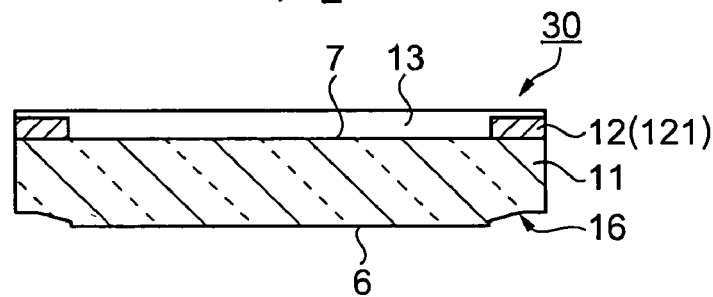
FIG. 12B is an E-E' cross-sectional view of FIG. 12A.
Figure 13:
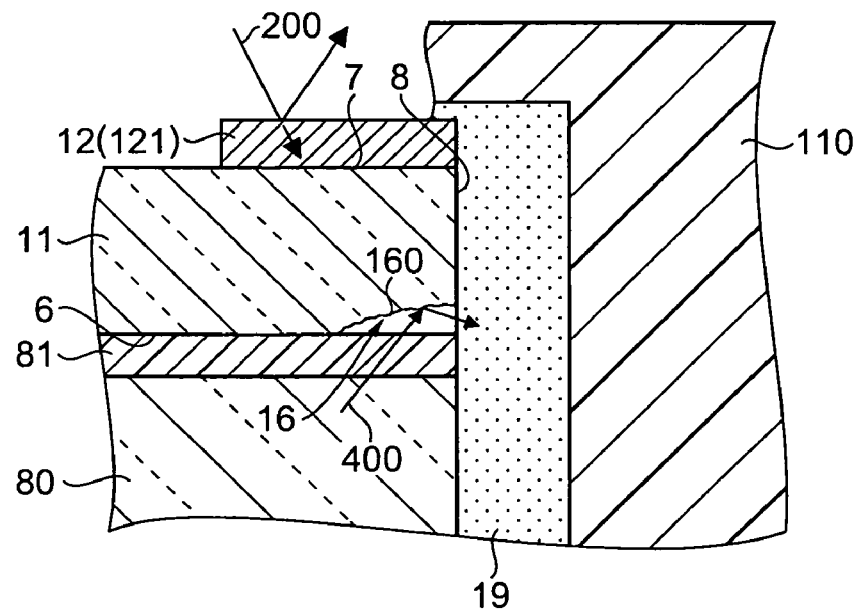
FIG. 13 is a partially expanded view showing the vicinity of a reflective film and a notch section.

FIG. 12A is a plan view showing a light-incident side dust-proof glass 30 of the third embodiment, and FIG. 12B is an E-E' cross-sectional view of FIG. 12A. FIG. 13 is a partially expanded view of the vicinity of the reflective film 121 and a notch section 16.

In FIG. 13, the embodiment differs from First Embodiment in the fact that the notch section 16 is a recess surface. The notch section 16 can be formed by changing the shape of the dicing blade. The recess surface of the notch section 16 has the shape such that the length of the normal line which is substantially perpendicular to the light incident surface 7 of the light-incident side dust-proof glass 30 and which intersects with the notch surface 160 decreases as the normal line gets closer from the light emitting surface 6 to the end face 8. The surface of the notch surface 160 may be either a rough surface or a smooth surface.

Advantageous effects according to Third Embodiment will now be described.

(9) The notch surface 160 is inclined so as to reflect the feedback light 400 toward the periphery. Therefore, the feedback light 400 which travels from the inside of the transmission-type liquid crystal panel 150 toward the notch section 16 can be reflected toward the filler 19. Since light is absorbed or scattered in the filler 19, generation of stray light can be reduced. As a result, display quality can be improved.

Fourth Embodiment

Figure 14A:
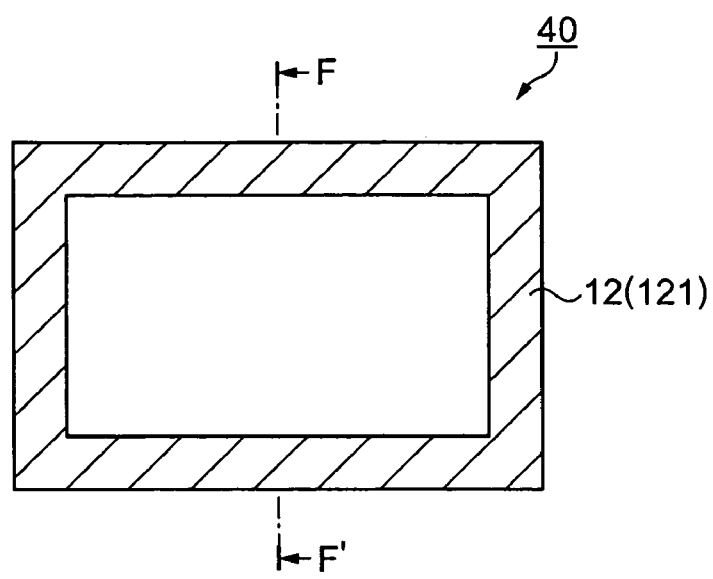
FIG. 14A is a plan view showing a light-incident side dust-proof glass according to Fourth Embodiment of the invention.
Figure 14B:
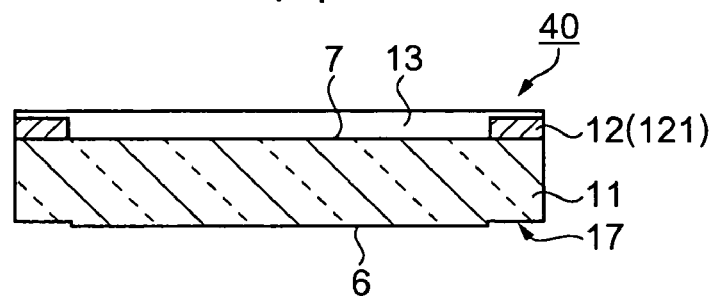
FIG. 14B is an F-F' cross-sectional view of FIG. 14A.
Figure 15:
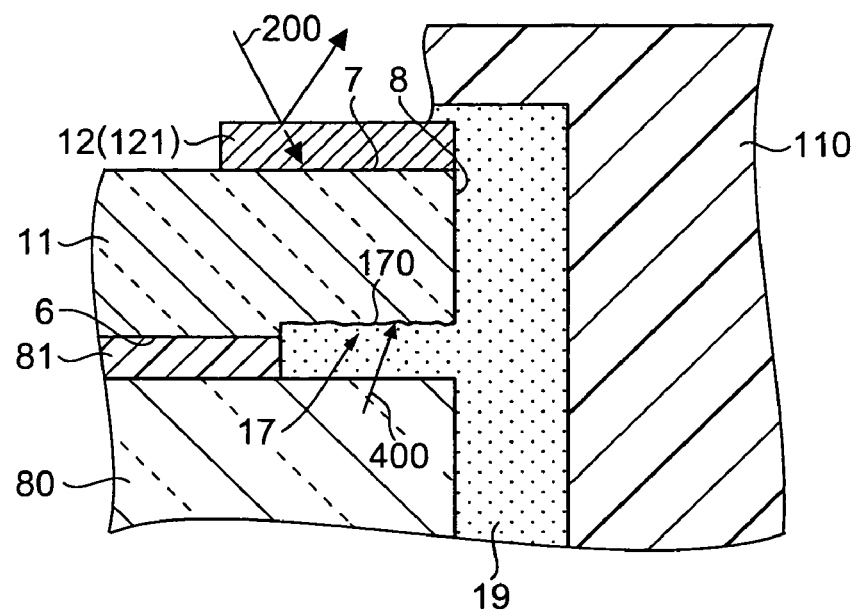
FIG. 15 is a partially expanded view showing the vicinity of a reflective film and a notch section.

FIG. 14A is a plan view showing a light-incident side dust-proof glass 40 of the fourth embodiment, and FIG. 14B is an F-F' cross-sectional view of FIG. 14A. FIG. 15 is a partially expanded view of the vicinity of the reflective film 121 and a notch section 17.

In FIG. 15, the embodiment differs from First Embodiment in the fact that the filler 19 is filled in the notch section 17. The surface of a notch surface 170 may be either a rough surface or a smooth surface.

Advantageous effects according to Fourth Embodiment will now be described.

(10) The feedback light 400 is absorbed or scattered by the filler 19 filled in the notch section 17. Therefore, reflection can be reduced at the notch section 17. Accordingly, the generation of stray light can be reduced, and display quality can be improved.

(11) Heat generated by the filler 19 that has absorbed the light can be transmitted to the case 110. Accordingly, heat can be released through the case 110. As a result, the cooling effect of the transmission-type liquid crystal panel 150 can be enhanced.

Fifth Embodiment

Figure 16A:
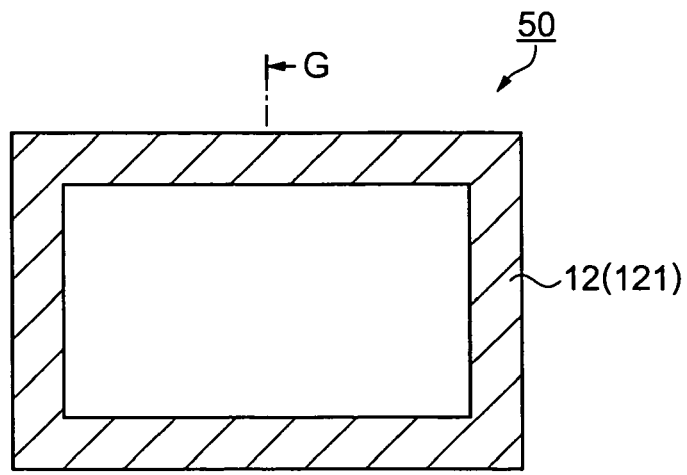
FIG. 16A is a plan view showing a light-incident side dust-proof glass according to Fifth Embodiment of the invention, and FIG. 16 B is a G-G' cross-sectional view of FIG. 16A.
Figure 16B:
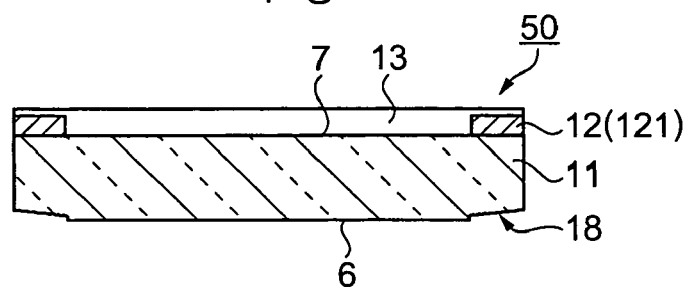
Figure 17:
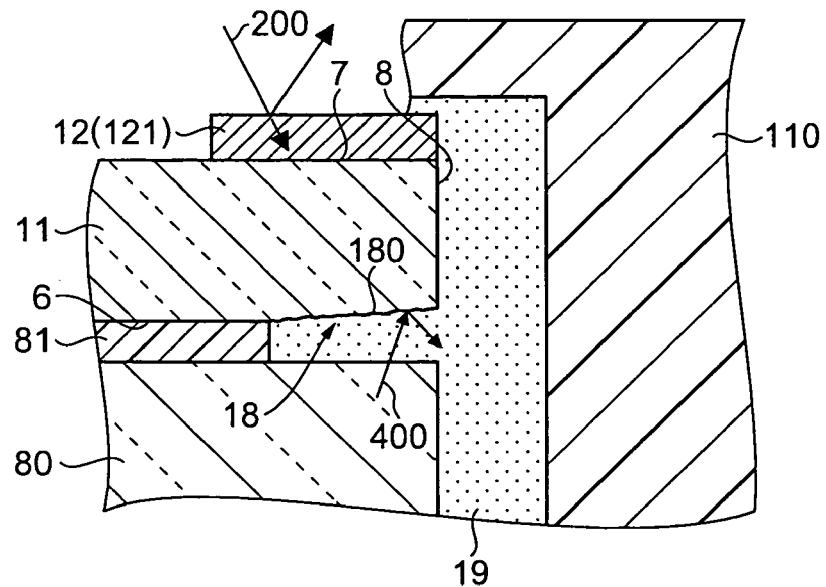
FIG. 17 is a partially expanded view showing the vicinity of a reflective film and a notch section.

FIG. 16A is a plan view showing a light-incident side dust-proof glass 50 of the fifth embodiment, and FIG. 16B is a G-G' cross-sectional view of FIG. 16A. FIG. 17 is a partially expanded view of the vicinity of the reflective film 121 and a notch section 18.

In FIG. 17, the embodiment differs from Fourth Embodiment in the fact that in the notch section 18 the length of the normal line which is substantially perpendicular to the light incident surface 7 and which intersects with a notch surface 180 decreases as the normal line gets closer to the end face 8. In addition, the notch surface 180 is a flat surface. The surface of a notch surface 170 may be either a rough surface or a smooth surface.

Advantageous effects according to Fifth Embodiment will now be described.

(12) In addition to the advantageous effects of Third Embodiment and Fourth Embodiment, the notch surface 180 is a flat surface. Therefore, the processing can be facilitated.

Sixth Embodiment

Figure 18:
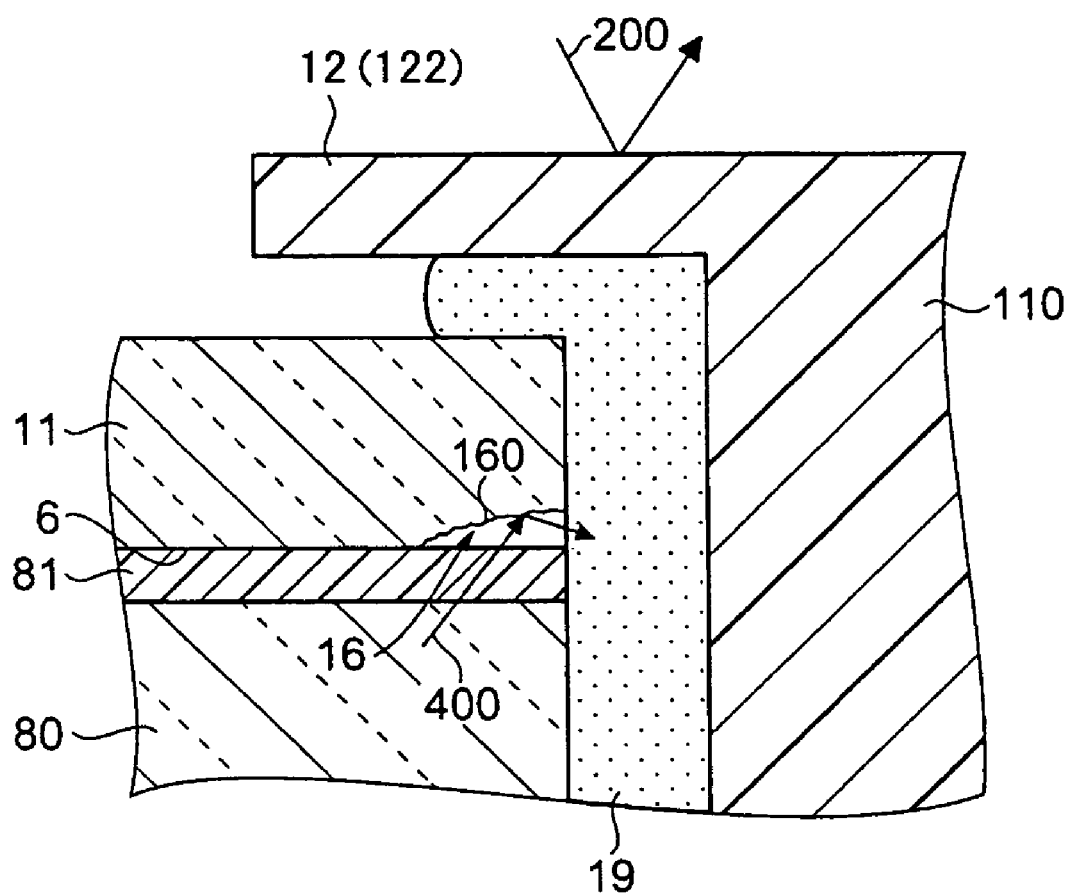
FIG. 18 is a partially expanded view showing the vicinity of the reflection section and the notch section of a light-incident side dust-proof glass according to Sixth Embodiment of the invention.

FIG. 18 is a partially expanded view of the vicinity of the reflective film 12 and the notch section 16 of the light-incident side dust-proof glass 50 of the sixth embodiment.

In FIG. 18, the embodiment differs from Third Embodiment in the fact that the reflective film 12 which is provided on the end face of the case 110 and which extends toward the side closer to the center of the light-incident side dust-proof glass 50 is an extension section 122.

Much of the incident light 200 is transmitted through the image display range of the dust-proof glass substrate 11, and incident to the inside of the transmission-type liquid crystal panel 150, while a part of the incident light 200 is reflected by the reflection section 12 as shown in FIG. 18.

Advantageous effects according to Sixth Embodiment will now be described.

(13) The extension section 122 of the case 110 is made to serve as the reflection section 12. Therefore, in addition to the advantageous effects of Third Embodiment, the embodiment enables improving display quality easily by merely providing the extension section 122 on the end face of the case 110.

Seventh Embodiment

Figure 19:
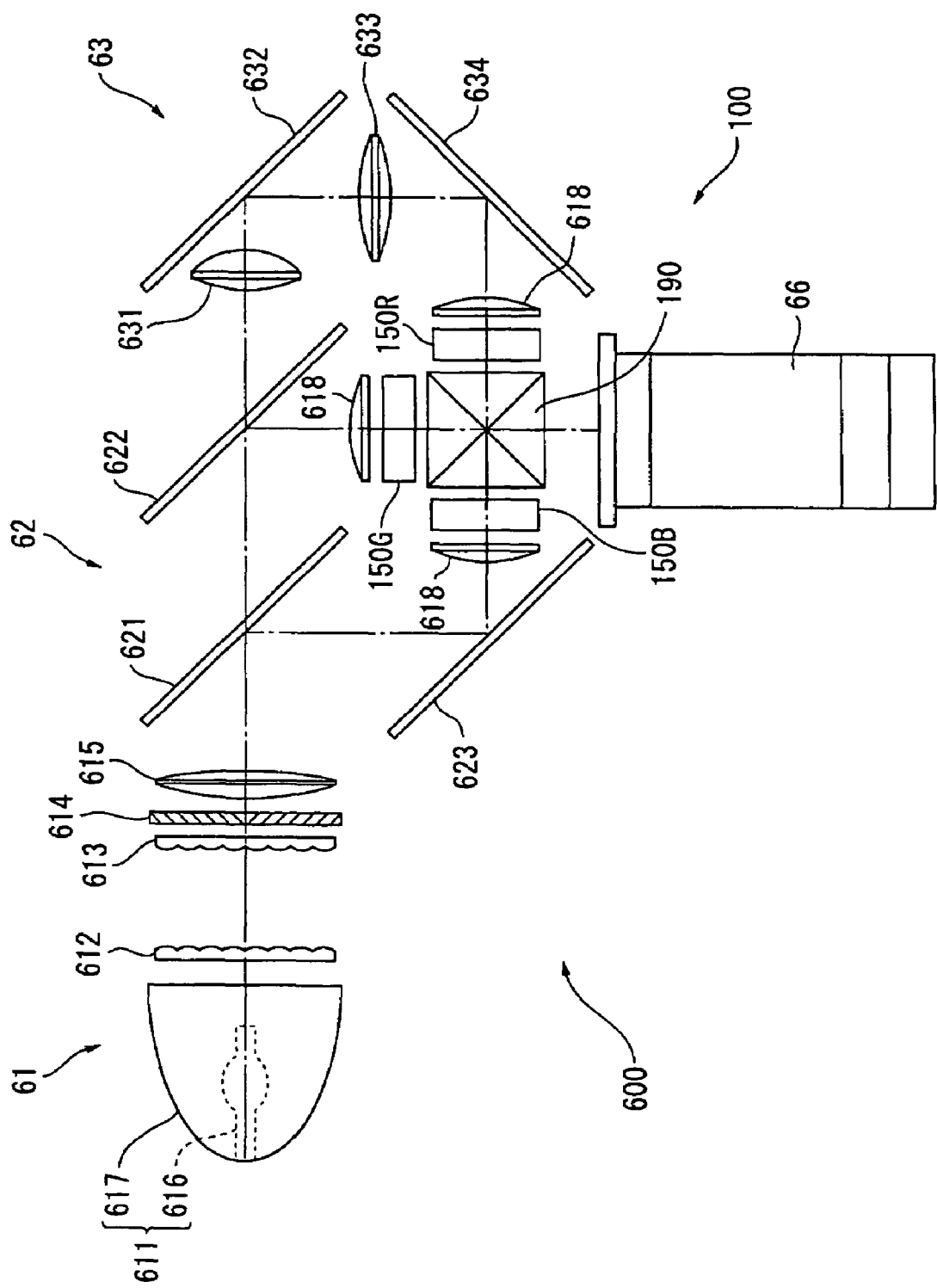
FIG. 19 is a plan view schematically showing a configuration of a projection-type image display device according to Seventh Embodiment of the invention.

FIG. 19 is a plan view schematically showing a configuration of a projection-type image display device 600 according the seventh embodiment. The projection-type image display device 600 includes the electro-optic device 100 as shown in the individual embodiments as described above.

As shown in FIG. 19, the configuration of the projection-type image display device 600 includes an integrator illumination optical system 61 that serves as a light source, a color separation optical system 62, a relay optical system 63, the electro-optic device 100 which modulates a light flux emitted from the light source in accordance with image information, and a projection lens 66 which magnifies the light flux modulated by the electro-optic device 100 and projects it.

The integrator illumination optical system 61 is an optical system for substantially uniformly illuminating an image formation range of the three transmission-type liquid crystal panels 150 that form the electro-optic devices 100. (The transmission-type liquid crystal panels 150 are referred to as the liquid crystal panels 150R, 150G, 150B for colors red, green, blue, respectively.) The integrator illumination optical system 61 includes a light source device 611, a first lens array 612, a second lens array 613, a polarization conversion element 614, and a superposed lens 615.

The light source device 611 includes a light source lamp 616 that serves as the radiation light source, and a reflector 617. The light source device 611 reflects a radiated light beam emitted from the light source lamp 616 by the reflector 617 so as to make parallel light beams, and emits the parallel light beams toward the outside.

A halogen lamp is employed as the light source lamp 616. A metal halide lamp, a high-pressure mercury lamp or the like may also be employed in place of the halogen lamp.

A paraboloidal mirror is employed as the reflector 617. In place of the paraboloidal mirror, a combination of a collimator concave lens and an ellipsoidal mirror may be employed.

The first lens array 612 has a configuration in which sub lenses are arrayed in a matrix shape. Each of the sub lenses has a substantially rectangular contour when viewed from the axial direction. Each of the sub lenses divides a light flux emitted from the light source lamp 616 to a plurality of sub-light fluxes. The contour shape of each of the sub lenses has been set so that it has a substantial similarity shape as the shape of the image formation range of the transmission-type liquid crystal panel 150. For example, if the aspect ratio (i.e., a ratio of the horizontal dimension to the vertical dimension) of the image formation range of the transmission-type liquid crystal panel 150 is 4:3, the aspect ratio of each of the sub lenses shall be also set to 4:3.

The second lens array 613 has a configuration, which is substantially similar as the first lens array 612, in which the sub lenses are arrayed in a matrix shape. The second lens array 613 as well as the superposed lens 615 has a function of forming an image of each of the sub lenses in the first lens array 612 on the transmission-type liquid crystal panel 150.

The polarization conversion element 614 is arranged between the second lens array 613 and the superposed lens 615, and is integrated with the second lens array 613 into a unit. Such polarization conversion element 614 converts light from the second lens array 613 into one type of polarization light. This increases light use efficiency in the electro-optic device 100.

Specifically, each partial light which has been converted by the polarization conversion element 614 into one type of polarization light is finally substantially superposed on the transmission-type liquid crystal panel 150 of the electro-optic device 100. In the projection-type image display device 600 using the transmission-type liquid crystal panel 150 of a type modulating the polarization light, only one type of polarization light can be utilized. Therefore, almost half of the light from the light source lamp 616 which emits multiple types of random polarization light is not utilized. Accordingly, use of the polarization conversion element 614 enables converting all light fluxes emitted from the light source lamp 616 into one type of polarization light and increasing light use efficiency in the electro-optic device 100.

Note that such polarization conversion element 614 is disclosed, for example, in JP-A-8-304739.

The color separation optical system 62 includes two dichroic mirrors 621, 622, and a reflection mirror 623. The color separation optical system 62 has a function of separating, with the dichroic mirrors 621, 622, a plurality of sub-light fluxes emitted from the integrator illumination optical system 61 into 3 colored rays: red (R), green (G) and blue (B).

The relay optical system 63 includes a light-incident side lens 631, a relay lens 633, and reflection mirrors 632, 634. The relay optical system 63 has a function of directing a red-colored lay that is a colored lay separated by the color separation optical system 62 into the transmission-type liquid crystal panel 150R.

At this time, the dichroic mirror 621 of the color separation optical system 62 transmits a red-colored ray component and a green-colored ray component of the light flux emitted from the integrator illumination optical system 61, and reflects a blue-colored ray component. A blue-colored ray reflected by the dichroic mirror 621 is subsequently reflected by the reflection mirror 623, passes through a field lens 618, and reaches the transmission-type liquid crystal panel 150B for the blue-colored ray. The field lens 618 converts each of the sub-light fluxes emitted from the second lens array 613 into the light flux which is parallel with respect to the center axis thereof (major light beam). The field lenses 618 which are provided on the light incident sides of the other transmission-type liquid crystal panels 150G, 150R also have a similar function.

Of the red-colored ray and the green-colored ray that are transmitted through the dichroic mirror 621, the green-colored ray is reflected by the dichroic mirror 622, passes through the field lens 618, and reaches the transmission-type liquid crystal panel 150G for the green-colored ray. On the other hand, the red-colored ray is transmitted through the dichroic mirror 622, passes through the relay optical system 63, subsequently passes through the field lens 618, and reaches the transmission-type liquid crystal panel 150R for the red-colored ray.

The reason why the relay optical system 63 is used for the red-colored ray is to prevent light use efficiency from deteriorating caused by scattered light or the like because the length of the light path for the red-colored ray is longer than the length of the light paths for rays of other colors. In other words, the reason is to transmit the sub-light fluxes which are incident to the light-incident side lens 631 to the field lens 618 as they are.

The electro-optic device 100 includes a similar configuration as those of individual embodiments as described above. Therefore, only the outline will be described below and detailed description will be omitted.

The electro-optic device 100 modulates the incident light flux in accordance with the image information so as to form a color image. The electro-optic device 100 includes the transmission-type liquid crystal panels 150R, 150G, 150B that serve as the light modulation device, the light-incident side dust-proof glass 10 (20, 30, 40, 50), the reflection section 12, the case 110 and the filler 19. The light-incident side dust-proof glass 10 (20, 30, 40, 50) is provided on the light incident surface of each of the transmission-type liquid crystal panels 150R, 150G, 150B. The reflection section 12 covers the outer edge of the light incident surface 7 of the light-incident side dust-proof glass 10 (20, 30, 40, 50). The case 110 covers the periphery of the liquid crystal device 60 which includes the transmission-type liquid crystal panels 150R, 150G, 150B and the light-incident side dust-proof glass 10 (20, 30, 40, 50). The filler 19 is provided in the gap between the periphery of the liquid crystal device 60 and the case 110 and absorbs or scatters light.

Furthermore, the electro-optic device 100 includes a cross dichroic prism 190 that serves as the color composition optical system.

In addition, the light-incident side dust-proof glass 10 (20, 30, 40, 50) includes the notch section 14 (16, 17, 18) which is formed at the outer edge of the light emitting surface 6 of the light-incident side dust-proof glass 10 (20, 30, 40, 50).

In FIG. 19, only the transmission-type liquid crystal panels 150R, 150G, 150B, and the cross dichroic prism 190 are shown and illustration of other configuration is omitted.

The cross dichroic prism 190 composites an optical image which is emitted from the liquid crystal device 60 and which is subsequently modulated for each colored ray so as to form the color image.

A dielectric multilayer for reflecting a red-colored ray and a dielectric multiplayer for reflecting a blue-colored ray are provided in a substantially X-shaped manner along the interfaces of four rectangular prisms in the cross dichroic prism 190. These dielectric multilayers composite three colored rays.

The projection lens 66 magnifies the color image which is composed by the cross dichroic prism 190 of the electro-optic device 100 and projects it.

Advantageous effects according to Seventh Embodiment will now be described.

(14) The electro-optic device 100 of the projection-type image display device 600 includes a similar configuration as those in individual embodiments as described above. Therefore, the embodiment generates less stray light and is superior in display quality.

Specifically, the reflection section 12 of the electro-optic device 100 is provided so as to cover the outer edge of the light incident surface 7 of the light-incident side dust-proof glass 10 (20, 30, 40, 50). Therefore, the incident light which travels to the outer edge of the light incident surface 7 is reflected toward the outside by the reflection section 12. Accordingly, generation of stray light which passes through the inside of the light-incident side dust-proof glass 10 (20, 30, 40, 50) and which subsequently travels to the transmission-type liquid crystal panel 150 is reduced. As a result, display quality is improved.

Furthermore, the notch section 14 (16, 17, 18) of the light-incident side dust-proof glass 10 (20, 30, 40, 50) is more recessed than the light emitting surface 6 of the light-incident side dust-proof glass 10 (20, 30, 40, 50). Therefore, the feedback light which travels from the inside of the transmission-type liquid crystal panel 150 toward the notch section 14 (16, 17, 18) is reflected by the notch section 14 (16, 17, 18) and subsequently travels to the filler 19, unlike the case where the feedback light is reflected by the reflective film of the light emitting surface of the dust-proof glass of the related art. Since light is absorbed or scattered in the filler 19, generation of stray light is reduced. As a result, display quality is improved.

The invention is not limited to the embodiments as described above. Modification, improvement and the like is included in the scope of the invention as long as the purpose of the present invention can be achieved.

For example, the reflective film 121 may be a multi-layer film. An adhesion film may be provided on the surface of the dust-proof glass substrate 11, and a metal film may be formed on the light incident side of the surface thereof.

The entire disclosure of Japanese Patent Application Nos: 2006-332892, filed Dec. 11, 2006 and 2007-262992, filed Oct. 9, 2007 are expressly incorporated by reference herein.

What is claimed is:

1. A dust-proof glass which is provided on a light incident surface of a transmission-type liquid crystal panel, the dust-proof glass comprising:
    a reflection section which is provided at an outer edge of a light incident surface of the dust-proof glass; and
    a notch section which is formed at an outer edge of a light emitting surface of the dust-proof glass, wherein
    a length of a normal line, the length being a distance between the light incident surface of the dust-proof glass and notch surface of the notch section, which is substantially perpendicular to the light incident surface of the dust-proof glass and intersects with a notch surface of the notch section decreases as the normal line gets closer to an end face of the dust-proof glass.

2. The dust-proof glass according to claim 1, wherein a surface roughness Ra of a notch surface of the notch section is 0.5 µm to 20 µm.

3. The dust-proof glass according to claim 1, wherein the reflection section is a metal film.

4. The dust-proof glass according to claim 1, wherein the notch section includes a light absorbing layer.

5. A projection-type image display device, comprising:
    an electro-optic device which modulates a light flux emitted from a light source in accordance with image information; and
    a projection lens which magnifies and projects the light flux modulated by the electro-optic device, wherein
    the electro-optic device includes the dust-proof glass according to claim 1.

6. An electro-optic device comprising:
    a transmission-type liquid crystal panel;
    a dust-proof glass which is provided on a light incident surface of the transmission-type liquid crystal panel;
    a reflection section which covers an outer edge of the light incident surface of the dust-proof glass;
    a case which covers a periphery of a liquid crystal device including the transmission-type liquid crystal panel and the dust-proof glass; and
    a filler which is provided in a gap between the periphery of the liquid crystal device and the case and absorbs or scatters light, wherein:
        the dust-proof glass includes a notch section which is formed at an outer edge of a light emitting surface of the dust-proof glass, and
        a length of a normal line the length being a distance between the light incident surface of the dust-proof glass and notch surface of the notch section, which is substantially perpendicular to the light incident surface of the dust-proof glass and intersects with a notch surface of the notch section decreases as the normal line gets closer to an end face of the dust-proof glass.

7. The electro-optic device according to claim 6, wherein the filler is filled also in a gap between the notch section and the transmission-type liquid crystal panel.

8. The electro-optic device according to claim 6, wherein the reflection section is an extension section which is provided on an end face of the case and extends toward a side closer to a center of the dust-proof glass.

9. The electro-optic device according to claim 6, wherein a surface roughness Ra of the notch surface of the notch section is 0.5 µm to 20 µm.

10. The electro-optic device according to claim 6, wherein the reflection section is a metal film which is provided at an outer edge of the light incident surface of the dust-proof glass.

11. The electro-optic device according to claim 6, wherein the notch section includes a light absorbing layer.

12. A projection-type image display device, comprising:
    an electro-optic device which modulates a light flux emitted from a light source in accordance with image information; and
    a projection lens which magnifies and projects the light flux modulated by the electro-optic device, wherein
    the electro-optic device includes the electro-optic device according to claim 6.

* * * * *